United States Patent [19]

Jippo

[11] Patent Number: 5,432,915
[45] Date of Patent: Jul. 11, 1995

[54] INTERPROCESSOR COMMUNICATION SYSTEM IN AN INFORMATION PROCESSING SYSTEM ENABLING COMMUNICATION BETWEEN EXECUTION PROCESSOR UNITS DURING COMMUNICATION BETWEEN OTHER PROCESSOR UNITS

[75] Inventor: Akira Jippo, Tokyo, Japan
[73] Assignee: NEC Corporation, Tokyo, Japan
[21] Appl. No.: 730,390
[22] Filed: Jul. 15, 1991

Related U.S. Application Data

[63] Continuation of Ser. No. 194,613, May 16, 1988, abandoned.

Foreign Application Priority Data

May 16, 1987 [JP] Japan ................... 62-118111

[51] Int. Cl.$^6$ ............ G06F 13/262; G06F 13/36; G06F 13/00
[52] U.S. Cl. ............ 395/325; 395/200; 395/725; 364/937.01; 364/940; 364/940.9; 364/229; 364/240; 364/241.7; 364/242.6; 364/242.92; 364/DIG. 1
[58] Field of Search ............ 395/800, 200, 325, 725; 340/825.5

[56] References Cited

U.S. PATENT DOCUMENTS

| | | | |
|---|---|---|---|
| 4,041,472 | 8/1977 | Shah et al. | 395/325 |
| 4,257,099 | 3/1981 | Appelt | 395/325 |
| 4,402,040 | 8/1983 | Evett | 395/325 |
| 4,412,281 | 10/1983 | Works | 395/575 |
| 4,430,699 | 2/1984 | Segarra et al. | 364/DIG. 1 |
| 4,456,970 | 6/1984 | Catiller et al. | 364/DIG. 2 |
| 4,470,114 | 9/1984 | Gerhold | 395/325 |
| 4,611,297 | 9/1986 | Dudley et al. | 364/DIG. 2 |
| 4,677,588 | 6/1987 | Benjamin et al. | 364/DIG. 2 |
| 4,695,944 | 9/1987 | Zandveld et al. | 395/325 |
| 4,713,793 | 12/1987 | Conforti | 364/DIG. 2 |
| 4,862,354 | 8/1989 | Fiacconi et al. | 395/200 |
| 4,868,741 | 9/1989 | Gula et al. | 395/325 |
| 4,897,784 | 1/1990 | Nay | 395/325 |
| 5,081,576 | 1/1992 | Ward | 395/325 |

Primary Examiner—Thomas G. Black
Assistant Examiner—Paul Harritt
Attorney, Agent, or Firm—Foley & Lardner

[57] ABSTRACT

An interprocessor communication system is used in an information processing system having a plurality of processor units. Those processor units are classified into a first group comprising control processor and IO processor units and into a second group comprising a plurality of execution processor units. In order to enable to start communication between two of the execution processors when one unit in the first group is performing communication with another one of the plurality of processor units, the interprocessor communication system comprises first through third locking circuits for issuing a first through third permission and then locking further issue of the first through third permissions, respectively. Two units in the first group communicate with each other after acquiring the first permission. Two units in the second group communicate with each other after acquiring the second permission. One unit in the first group communicates with one unit in second group after acquiring the third permission. Even when one unit in the first group is communicating with one unit in the second processor group, two other units in the second processor group can acquire the second permission to thereby communicate with each other.

14 Claims, 10 Drawing Sheets

INTERPROCESSOR COMMUNICATION SYSTEM IN AN INFORMATION PROCESSING SYSTEM ENABLING COMMUNICATION BETWEEN EXECUTION PROCESSOR UNITS DURING COMMUNICATION BETWEEN OTHER PROCESSOR UNITS

This application is a continuation of application Ser. No. 07/194,613, filed May 16, 1988, now abandoned.

BACKGROUND OF THE INVENTION

1) Field of the Invention

The present invention relates to information processing systems, and in particular, to control of communication between processor units in such information processing systems.

2) Description of the Prier Art

In the prior art, a known information processing system comprises a first processor group and a second processor group of a plurality of execution processor units (EPUs). The first processor group comprises a control processor unit and an input/output (IO) processor unit. The control processor unit performs management of resources of the information processing system. In another case, the control processor unit also performs compile link of user's programs. The IO processor unit is for controlling data transmission from and to an IO device. The first processor group is coupled with a control storage unit through a first system control unit or a first storage control unit and with an operation storage unit through the first system control unit and a second system control unit or a second storage control unit.

The control storage unit stores control programs and the operation storage unit stores a large amount of data to be processed by the plurality of EPUs.

The plurality of EPUs of the second processor group are coupled with the operation storage unit through the second system control unit and execute tasks or processes at a high processing speed while performing reading and writing of data for the operation storage units through the second system control unit.

In operation of the information processing system, communication is required between processor units in the first processor group, between two EPUs in the second processor group and between one processor unit in the first processor group and one EPU in the second processor group. Accordingly, the information processing system has an interprocessor communication system which comprises transmission means commonly used by those processor units in the first and the second processor groups. Communication between a first and a second of those processor units can be performed through the transmission means. That is, the first processor unit transmits, as a source processor unit, communication information to the transmission means. The communication information comprise a message and a destination address representative of the second processor unit. The second processor unit decides the destination address and processes the message as a receiving processor unit. The receiving processor unit transmits a reply signal to the source processor unit through the transmission means after processing the message. Thus, the communication is completed.

As the transmission means, a known type uses first and second buses provided in the first and second system control units, respectively, and a third bus connecting the first and the second, buses. The first processor group and the second processor group are coupled with the first and second buses, respectively. In this type of the transmission means, the communication information and the reply signal are transmitted through the first, the second, and/or the third buses between the source processor unit and the receiving processor unit.

Another type of transmission means comprises a message box or a mail box for storing messages from the source processor unit in addition to the buses. The buses are used for transmitting not the message but the destination address alone. The receiving processor unit having the destination address reads the message from the message box after deciding the destination address.

In use of any one of the above-described two types of transmission means, there is a problem of contention of communication requests from those processor units. That is, when communication is performed between a first and a second of those processor units, a communication request often occurs in a third of the processor units. In order to resolve a problem of contention of communication requests, the interprocessor communication system has locking means for controlling permission of information transmission right. When one processor unit has the permission and performs the interprocessor communication with another processor unit, the locking means locks issue of permission to the other processor units so as to prevent any other processors from sending out communication information to the transmission means. The locking means are usually provided in the control storage unit.

In response to a lock request from a specific one of those processor units which firstly requests communication during a waiting or initial condition where no interprocessor communication is performed, the locking means issues permission to the specific processor unit and locks issue of permission so as to prevent other processor units from sending out communication information to the transmission means. That is, when the specific processor unit has the permission, the locking means holds information that the specific processor unit has the permission and issues non-permission in response to the lock request from any one of the other processor units.

After reception of the permission from the locking means, the specific processor unit performs the communication as the source processor unit with a desired one of the processor units which is called the receiving processor unit through the transmission means in the manner as described above. Then, the specific processor unit produces a communication completion signal or an unlock request to the locking means when receiving the reply signal from the receiving processor unit.

The locking means unlocks issue of the permission in response to the unlock request from the specific processor unit, then the locking means restores to the initial or waiting condition.

In the interprocessor communication system as described above, the locking means locks issue of the permission when communication is carried out between a first and a second of those processor units. Accordingly, the other processor units cannot perform interprocessor communication.

On the other hand, it is often required to establish synchronization and perform communication between EPUs which are carrying out parallel processing. However, the communication between EPUs cannot be performed when the locking means locks issue of the permission by a previous lock request from another processor unit. This results into degradation of performance of EPUs and decreases throughput of the information processing system.

SUMMARY OF THE INVENTION

Accordingly, it is an object of the present invention to provide an interprocessor communication system for use in an information processing system comprising a control processor unit, an IO processor unit, and a plurality of EPUs wherein interprocessor communication can be started between EPUs even when one of the control processor unit and the IO processor unit is performing communication with another of those processor units.

An interprocessor communication system is used in an information processing system having a first processor group comprising at least one control processor unit and at least one input/output (IO) processor unit and a second processor group of a plurality of execution processor units. The control processor unit performs resource management and the IO processor unit controls data transmission from and to an IO device. The execution processor units executes tasks. The interprocessor communication system comprises transmission means for transmitting communication information from one of those processor units in the first and the second processor groups as a source processor unit to another processing unit as a receiving processor unit. The source processor unit has permission for transmitting communication information to the transmission means. The interprocessor communication system according to the present invention comprises: each of processor units in the first processor group comprising first request producing means for producing a first lock request so as to acquire a first permission, a first specific one in the first processor group generating the first lock request when desiring to communicate with another processor unit in the first processor group, the first specific processor unit acquiring the first permission and transmitting as a first source processor unit first communication information with another processor unit in the first processor group as a first receiving processor unit; each of processor units in the second processor group comprising second request producing means for producing a second lock request so as to acquire a second permission, a second specific one in the second processor group generating the second lock request when desiring to communicate with another processor unit in the second processor group, the second specific processor unit acquiring the second permission and transmitting as a second source processor unit second communication information with another processor unit in the second processor group as a second receiving processor unit; each of the first and second request means producing a third lock request for acquiring a third permission, a third specific one in one groups of the first and the second processor group generating the third lock request when desiring to communicate with another processor unit in the other group, the third specific processor unit acquiring the third permission and transmitting as a third source processor unit third communication information with one processor unit in the other group of the first and the second processor groups as a third receiving processor unit; first locking means for controlling the first permission, the first locking means issuing the first permission to the first specific processor unit in response to the first lock request from the first specific processor unit and thereafter locking issue of the first permission to thereby reject the first request from any one of other processor units in the first processor group; second locking means for controlling the second permission, the second locking means issuing the second permission to the second specific processor unit in response to the second lock request from the second specific processor unit and thereafter locking issue of the second permission to thereby reject the second request from any one of other processor units in the second processor group; and third locking means for controlling the third permission, the third locking means issuing the third permission to the third specific processor unit in response to the third lock request from the third specific processor unit and thereafter locking issue of the third permission to thereby reject the third locking request from any one of other processor units in the first and the second processor group.

According to an aspect, when the third receiving processor unit is one in the first processor group, the third receiving processor unit produces the first lock request upon receiving the third communication information. While, when the third source processor unit is one in the first processor group, the third source processor unit has the first permission in addition to the third permission.

DESCRIPTION OF PREFERRED EMBODIMENTS

Figure 1:
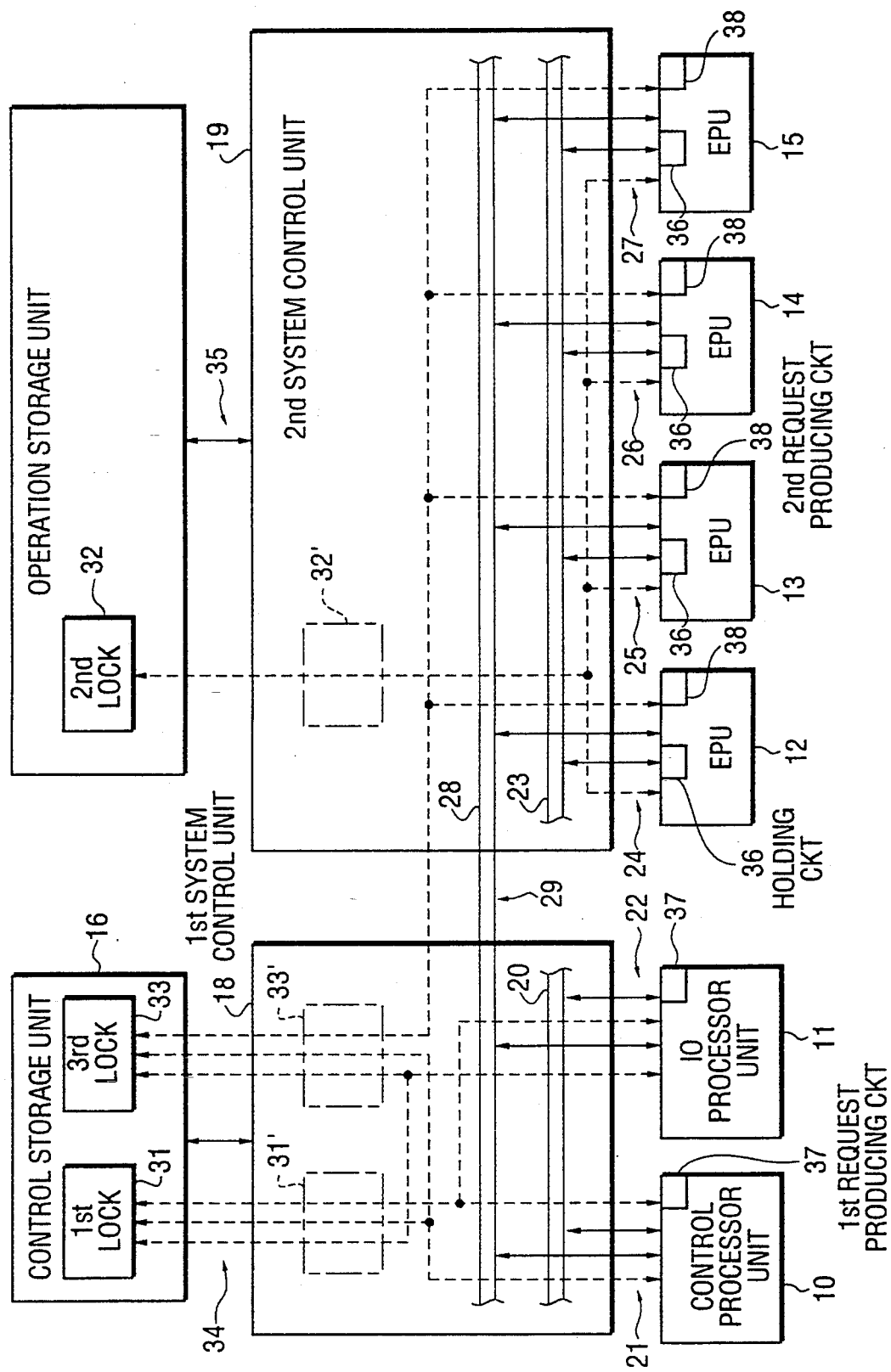
FIG. 1 is a block diagram view of an information processor system having an interprocessor communication system according to an embodiment of the present invention.

Referring to FIG. 1, an information processing system shown therein comprises a first processor group comprising a control processor unit 10 and an IO processor unit 11 and a second processor group comprising a plurality of execution processor units (EPUs). Four EPUs 12, 13, 14, and 15 are shown in the embodiment.

The first and the second processor groups are coupled with a control storage unit 16 and an operation storage unit 17 through a first system control unit 18 and a second system control unit 19.

The information processing system has an interprocessor communication system for enabling those processors 10 through 15 to perform communication to one another. The interprocessor communication system comprises three transmission means and three locking means for locking the three transmission means, respectively.

As a first one of the three transmission means, the first system control unit 18 is provided with a first bus 20 with which the control processor unit 10 and the IO processor unit 11 are commonly coupled through interfaces 21 and 22, respectively. Communication between processor units 10 and 11 in the first processor group is performed through the first bus 20. That is, one of the processor units transmitting, as a source processor unit, communication information to the first bus 20. The communication information comprises message together with an address of the other processor unit as a destination address to the first bus 20. In detail, the communication information comprises the destination address, a source address representative of the source processor unit, a command, and a set of data, which are shown as DESTINATION, SOURCE, COMMAND, and DATA, respectively, in an information register in FIG. 12.

The second system control unit 19 is provided with a second bus 23 as a second one of the three transmission means. The EPUs 12 through 15 are commonly coupled to the second bus 23 through interfaces 24, 25, 26, and 27, respectively. A source one of the EPUs transmits message and a destination address to the second bus 23 to perform communication between the source EPU and another EPU having the destination address.

Further, the first and the second system control units 18 and 19 have a third bus 28 as a third one of the three transmission means extending through an interface 29 between the first and the second system control units 18 and 19. The third bus 28 is coupled with all of those processors 10 to 15 through interfaces 21, 22, 24–26, and 27, respectively. Communication is performed between one processor unit in the first processor group and one EPU in the second processor group so that a source one of them transmits message and a destination address of the other one to the third bus 28.

The three locking means are shown as a first, a second, and a third locking circuits 31, 32, and 33 for locking the first, the second, and the third buses 20, 23, and 28, respectively.

In the shown embodiment, the first and the third locking circuits 31 and 33 are formed on a memory area of the control storage unit 16, while the second locking circuit 32 is formed on a memory area of the operation storage unit 17. However, those first and third locking circuits 31 and 33 may be formed in the first system control unit 18, as shown by dot-and-dashed line blocks 31' and 33' in the figure. Similarly, the second locking circuit 32 may also be formed in the second system control unit 19 as shown by a dot-and-dashed line block 32' in the figure.

Now, description will be made as to examples of the interprocessor communication with reference to FIGS. 2 to 5, below.

Figure 2:
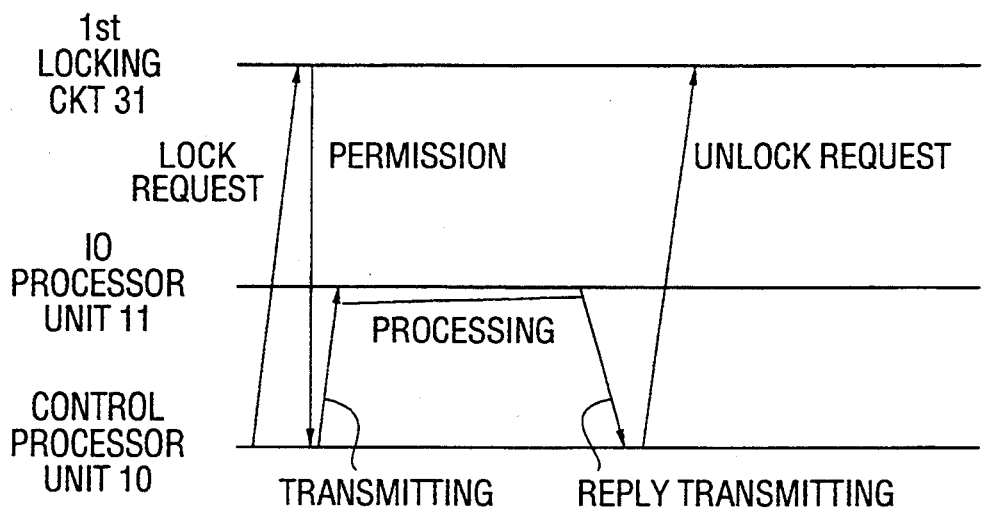
FIGS. 2, 3, 4, and 5 are views illustrating different operational examples of interprocessor communication performed by processor units in the embodiment of FIG. 1.

Referring to FIG. 2, the control processor unit 10 firstly generates a lock request when a communication request for the IO processor unit 11 occurs in the control processor 10. The lock request is delivered to the first locking circuit 31 through the interface 21, the first system control unit 18 and an interface 34 between the control storage unit 16 and the first system control unit 18. When the first bus 20 is not locked, the locking circuit 31 issues a permission signal to the control processor unit 10. After issuing the permission signal, the first locking circuit 31 generates a non-permission signal in response to another lock request generated from any one of the other processors until an unlock request is delivered from the control processor 10. Upon receipt of the permission signal, the control processor unit 10 transmits, as a source unit, communication information to the first bus 20. The communication information comprises message and a destination address representative of the IO processor unit 11.

When the IO processor unit 11 receives the communication information on the first bus 20 and decides the destination address, the IO processor unit 11 processes the message. When completing the processing, the IO processor unit 11 transmits a reply signal for the control processor unit 10 to the first bus 20.

The control processor unit 10 generates the unlock request upon receipt of the reply signal through the first bus 20. Thus, the first locking circuit 31 receives the unlock signal and then, unlocks the first bus 20. Thereafter, the first locking circuit 31 is in a waiting condition for another fresh lock request.

Figure 3:
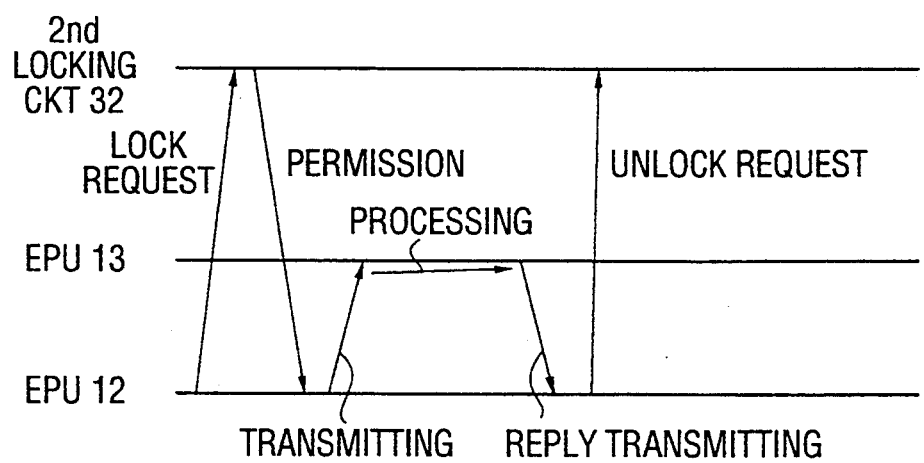

Next, referring to FIG. 3, an example is described where two EPUs, for example, 12 and 13 perform the interprocessor communication. The second bus 23 and the second locking circuit 32 are used in the interprocessor communication.

When a communication request occurs in EPU 12, a lock request is delivered to the second locking circuit 32 from the EPU 12 through the interface 24, the second system control unit 19, and an interface 35 between the operation storage unit 17 and the second system control unit 19. The second locking circuit 32 issues a permission signal for the EPU 12 when the second bus is not locked but issues a non-permission signal when the second bus is locked. After issuing the permission signal, the second locking circuit 32 rejects lock requests from any other processors in the similar manner as described above in connection with the first locking circuit 31.

When the EPU 12 receives the permission signal from the second locking means, the EPU 12 transmits communication information comprising message and a destination address representative of the EPU 13 to the second bus 23 through the interface 24. The EPU 13 receives and decodes the communication information on the second bus 23 and decides the destination address. Then, the EPU 13 processes the message in the communication information and transmits a reply signal for the source EPU 12 to the second bus 23 after completion of the processing. When the source EPU 12 receives the reply signal from the EPU 13 through the second bus 23, EPU 12 generates an unlock request for the second locking circuit 32. Thus, the second bus 23 is unlocked by the second locking means 32 which, in turn, waits for a fresh lock request from any one of EPUs.

Figure 4:
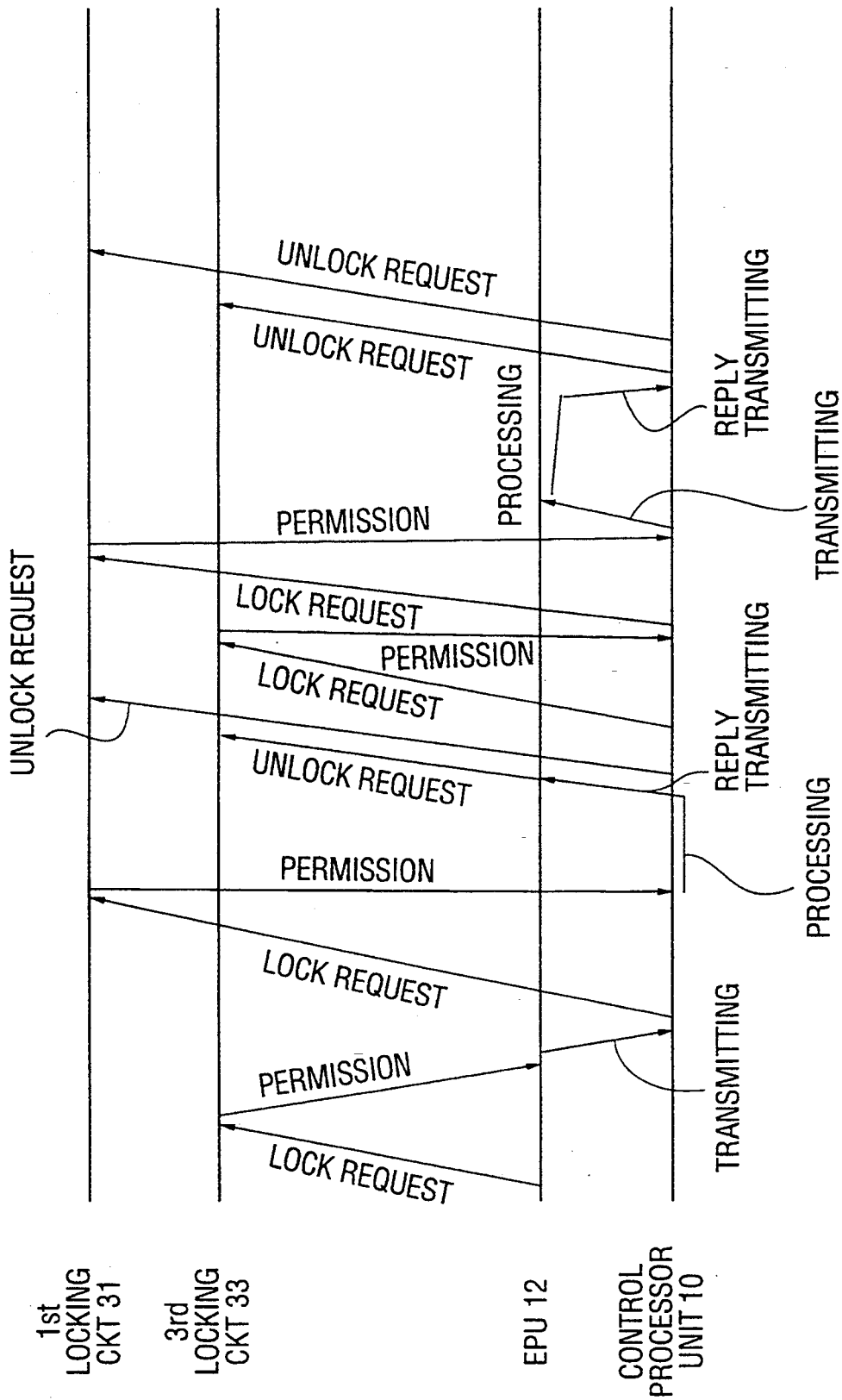

Referring to FIG. 4, description is made as to interprocessor communication performed between first and second processor groups.

When the interprocessor communication request for one of processor units, for example, the control processor unit 10 in the first processor group occurs in one of EPUs, for example, EPU 12 in the second processor group, the EPU 12 generates a lock request which is, in turn, delivered to the third locking circuit 33 through the interface 24, the second system control unit 19, the interface 29, the first system control unit 18, and the interface 34. The third locking-circuit 33 issues a permission signal for the EPU 12 when the third bus is not locked. Thereafter, the third locking circuit 33 rejects another fresh lock request until the third locking circuit 33 receives an unlock request from the EPU 12 and unlocks the third bus 28.

Upon reception of the permission signal from the third locking circuit 33, the EPU 12 as a source unit transmits communication information to the third bus 28. When the control processor unit 10 receives and decides a destination address in the communication information to be its own address, the control processor 10 generates the lock request to the first locking circuit 31 to lock the first bus 20. After receiving the permission signal from the first locking circuit 31, the control processor unit 10 processes message in the received communication information and delivers a reply signal for the source EPU 12 to the third bus 28 and also delivers the unlock request to the first locking circuit 31 after completion of the message processing. Then, the first bus 20 is unlocked and is, thereafter, usable by any processor units in the first processor group.

During the message processing, the control processor unit 10 is not requested to have communication from any other processor units, because the first and the third buses 20 and 28 are locked by the first and the third locking circuits 31 and 33, respectively. Therefore, the control processor unit 10 can avoid missing communication information transmitted to itself.

When receiving the reply signal from the control processor unit 10, the EPU 12 generates the unlock request to the third locking circuit 33 to unlock the third bus 28.

Thereafter, when the control processor unit 10 desires to communicate with the EPU 12, the control processor 10 delivers the lock request to the third looking circuit 33 so as to lock the third bus. After receiving the permission signal from the third locking circuit 33, the control processor unit 10 produces the lock request for the first locking circuit 31 to lock the first bus 20. Upon receipt of the permission signal from the first locking circuit 31, the control processor unit 10 transmits message and a destination address representative of the EPU 12 as communication information to the third bus 28. Then, the EPU 12 receives and decides the communication information and processes the message. After completion of the message processing, the EPU 12 delivers a reply signal for the control processor unit 10 to the third bus 28. When the control processor unit 10 receives the reply signal, the control processor unit 10 generates the unlock request which is delivered to the first and the third locking circuits 31 and 33 so as to unlock the first and the third buses 20 and 28.

Figure 5:
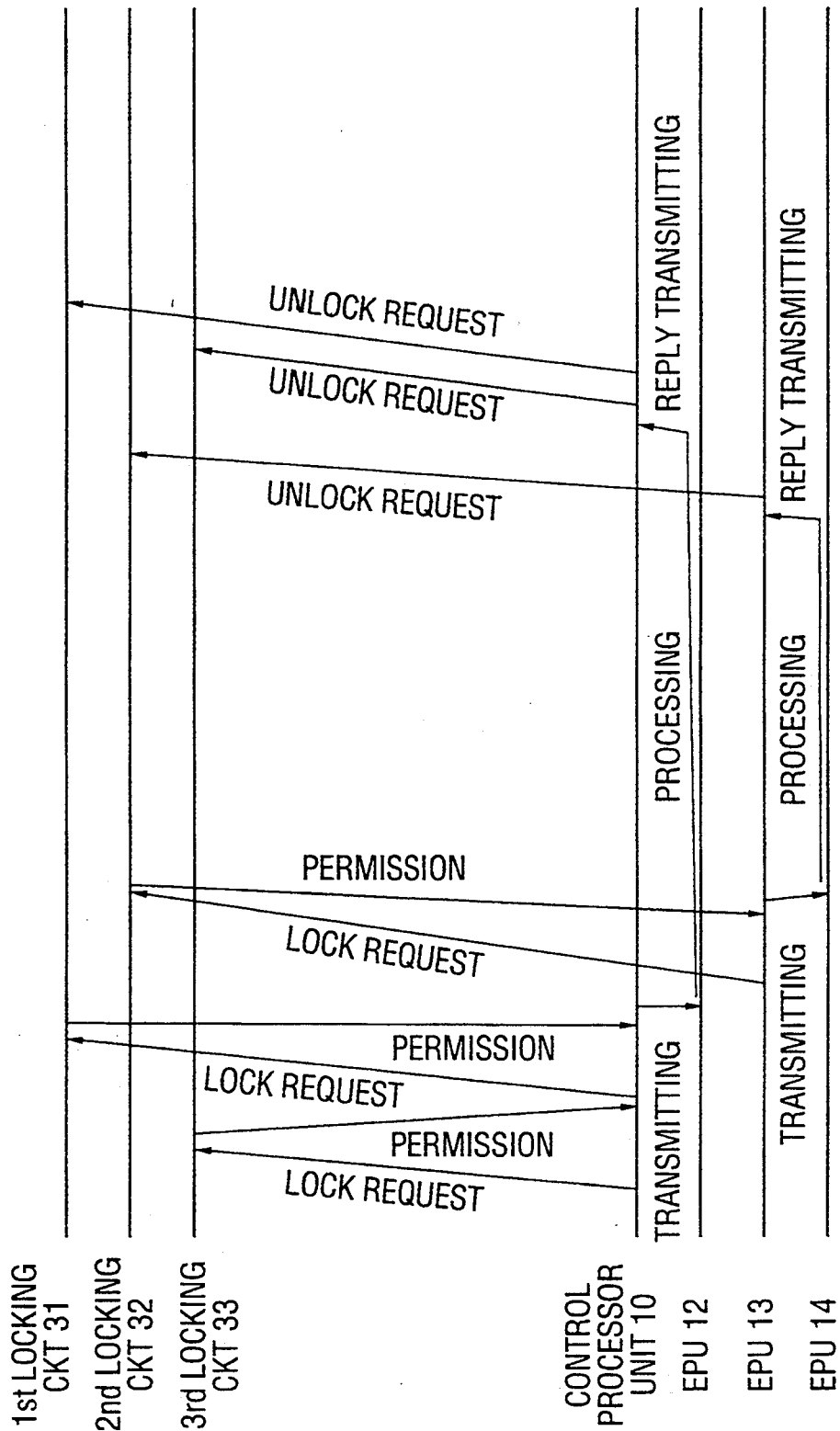

Referring to FIG. 5, description will be made as to an example where a communication request occurs between two EPUs, for example, 13 and 14 in the second processor group during communication between one processor unit, for example, the control processor unit 10 in the first processor group and one EPU, for example, 12 in the second processor group.

The communication between the control processor unit 10 and EPU 12 is established in the manner as described above in connection with FIG. 4. When the communication request occurs in EPU 13 during the message processing at EPU 12, EPU 13 generates a lock request for the second locking circuit 32. Then, the second locking circuit 32 delivers the permission signal to EPU 13 because the second locking circuit 32 does not lock the second bus 23. Accordingly, EPU 13 starts the interprocessor communication with EPU 14 in the similar manner as described in connection with FIG. 3. Then, EPU 14 completes the message processing and transmits a reply signal to the second bus 23. In response to the reply signal, EPU 13 delivers the unlock request to the second locking circuit 32 so as to unlock the second bus 23.

It will be noted that the interprocessor communication can be performed between two EPUs even when another EPU is performing communication with one processor unit in the first processor group. Further, when one EPU requests, as a source EPU, communication with a specific one of EPUs which is now performing communication with one processor unit in the first processor group, the source EPU can transmit communication information for the specific EPU to the second bus 23 which is not locked by the second locking circuit 32. However, the specific EPU cannot receive the communication information and the communication information is missed. In order to avoid missing the communication information, each of the EPUs 12 to 15 may comprise a holding circuit as shown at 36. The holding circuit 36 comprises register means which holds the communication information, as held communication information, received through the second bus 23 until completion of the previous communication with the processor unit in the first processor group. After the completion, the EPU can process the held communication information.

Returning to FIG. 1, each of the control processor unit 10 and the IO processor unit 11 has a request producing circuit 37 for producing the lock request and the unlock request for the first and the third locking circuits 31 and 33. The request producing circuit 37 also receives and processes the permission and the non-permission from the first and the third locking circuits 31 and 33. Each of the execution processor units 12 to 15 also has a request producing circuit 38 for producing the lock request and the unlock request for the second and the third locking circuits 32 and 33. The request producing circuit 38 also receives and processes the permission and the non-permission from the second and the third locking circuits 32 and 33. In the figure, dotted lines indicate flows of the lock request, the unlock request, the permission signal, and the non-permission signal transmitted between each of first through third locking circuits and each of processor units in the first and the second processor groups.

Figure 6:
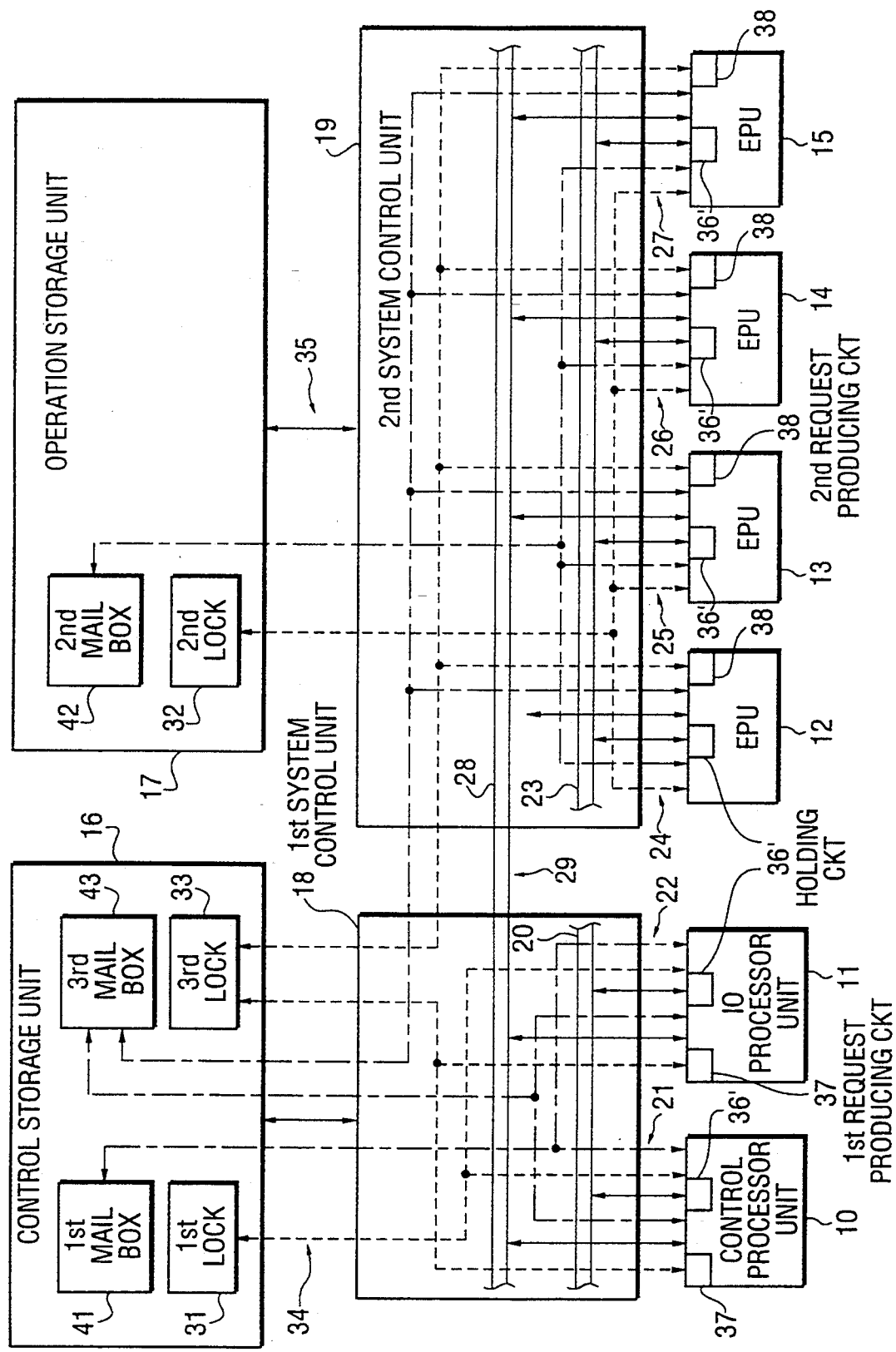
FIG. 6 is a block diagram view similar to FIG. 1 illustrating an interprocessor communication system according to another embodiment.

Now, turning to FIG. 6, description is made as to another embodiment wherein the interprocessor communication system employs another type of the transmission means using message box or mail box means in addition to the bus means. In the another type transmission means, the mail box is used for storing message by writing operation of a source processor unit, and the stored message is read by a receiving processor unit having the destination address. Accordingly, the bus means transmits only the destination address without the message.

In the figure, similar portions are represented the same reference numerals as in FIG. 1, and description thereto is omitted for the purpose of simplification of the description.

In the shown embodiment, the mail box means comprises a first, a second, and a third mail box 41, 42 and 43 which is paired with the first, the second, and the third buses 20, 23, and 28, respectively.

The first and the third mail boxes 41 and 43 are usually formed together with the first and the third locking circuits 31 and 33 on a memory area in the control storage unit 16, while the second mail box 42 is formed together with the second locking circuit 32 on the memory area in the operation storage unit 17. However, the first and the third mail boxes 41 and 43 may be provided in the first system control unit 18 in the similar manner as the first and the third locking circuits 31' and 33' as shown in FIG. 1. Similarly, the second mail box 42 may also be provided in the second system control unit 19.

The first, the second, and the third mail boxes 41 to 43 are used for storing messages paired with destination addresses to be transmitted to the first, the second, and the third buses 20, 23, and 28 from source processors, respectively. Therefore, the first, the second, and the third mail boxes 41 through 43 are locked together with the first, the second, and the third buses 20, 23, and 28 by the first, the second, and the third locking circuits 31 through 33, respectively.

It will be noted that the interprocessor communication in the present embodiment can be performed in the similar manner as in the first embodiment except for writing and reading message for the mail box means.

Figure 7:
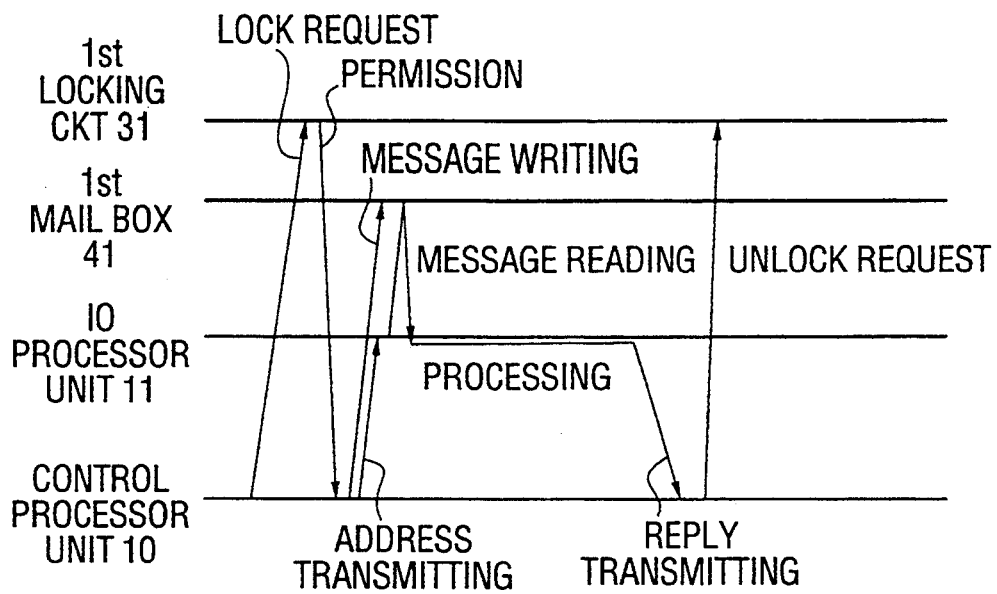
FIGS. 7, 8, 9, and 10 are views illustrating different operational examples of interprocessor communication performed by processor units in the embodiment of FIG. 6.

Referring to FIG. 7, an example similar to FIG. 2 is illustrated where communication is performed between the control processor unit 10 as a source unit and the IO processor unit 11 as a receiving processor unit. The control processor unit 10 firstly delivers the lock request to the first locking circuit 31 and receives the permission signal from the first locking circuit 31 in the similar manner as in the example of FIG. 2. Then, the control processor unit 10 writes a message into the first mail box 41 through the interface 21, the first system control unit 18, and the interface 34. At the same time, the control processor unit 10 transmits a destination address representative of the IO processor unit 11 to the first bus 20 without the message. The IO processor unit 11 performs reading operation of message stored in the first mail box 41 in response to reception of the destination address. Thereafter, operation is carried out in the similar manner as in the example of FIG. 2 and the interprocessor communication is completed.

Figure 8:
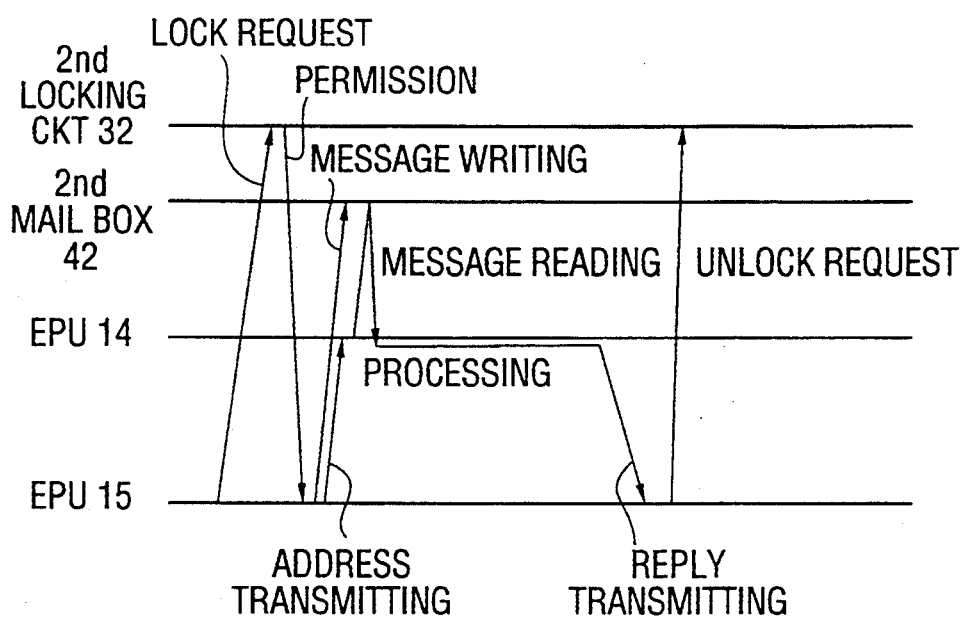

FIG. 8 illustrates an example similar to FIG. 3 wherein two EPUs perform interprocessor communication. It will be noted from comparison of FIG. 8 with FIG. 3 that the source EPU performs writing operation of message into the second mail box 42 without transmitting of the message to the second bus 23, while the destination EPU performs read of the message from the second mail box 42 in the present embodiment. The other operation is similar to that in the example of FIG. 3.

Figure 9:
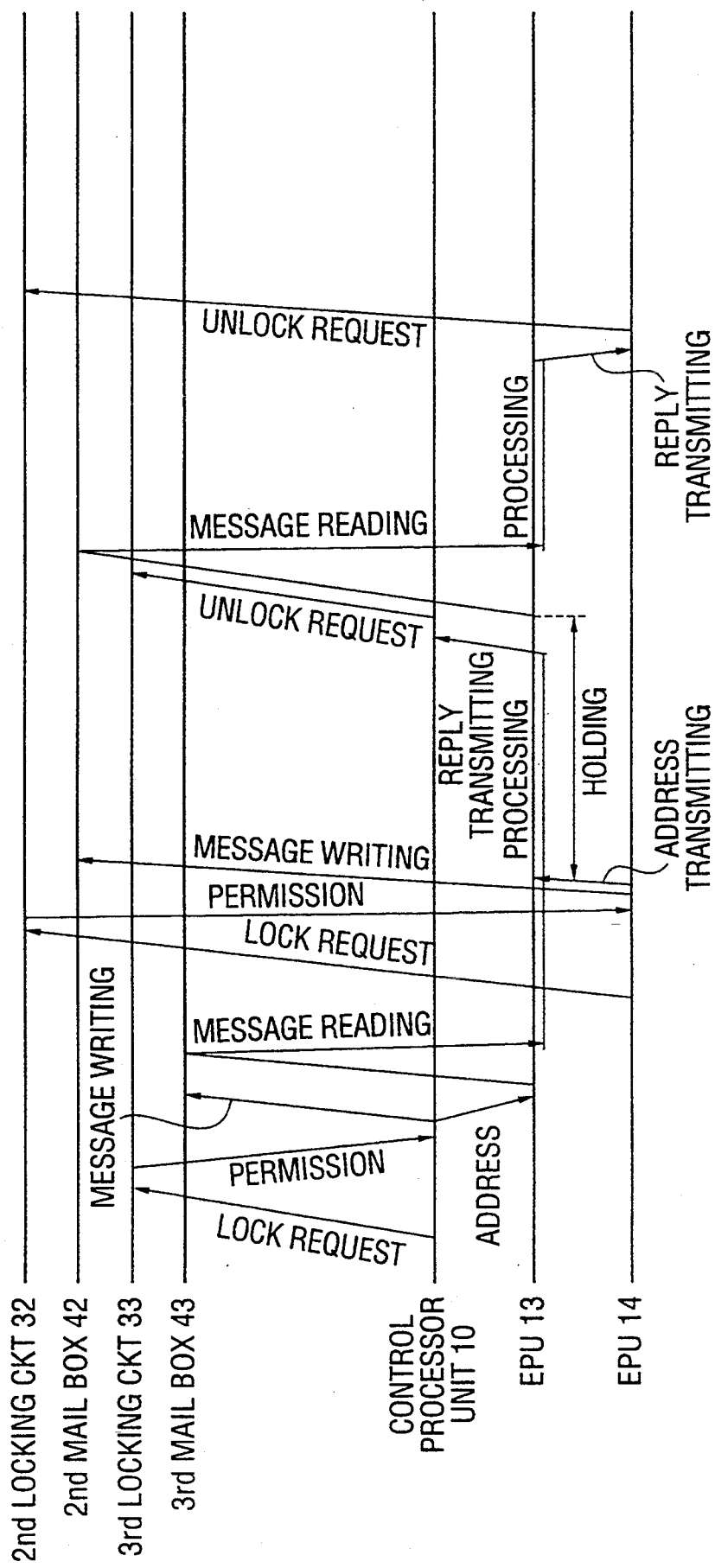

Referring to FIG. 9, an example is illustrated where the control processor unit 10 performs, as a source unit, communication with one of EPUs, for example, EPU 13. The example is similar to the example shown at a right half in FIG. 4.

The source unit or the control processor unit 10 firstly generates the lock request to the third locking circuit 33. When receiving the permission signal from the third locking circuit 33, the control processor unit 10 transmits a destination address representative of the EPU 13 to the third bus 28 while writing message into the third mail box 43. The present embodiment is different from the previous embodiment of FIG. 1, and the control processor unit 10 is not required to generate the lock request for the first locking circuit 31 prior to start the transmission of the destination address. This is because the transmission means uses the mail boxes. The detailed reason will later be described in connection with FIG. 10.

When the destination EPU 13 receives the destination address through the third bus 28, the EPU 13 reads the message from the third mail box 43 and processes the message. After completion of the message processing, the EPU 13 delivers the reply signal for the source processor unit 10 through the third bus 28. In response to the reply signal, the control processor unit 10 produces the unlock request for the third locking circuit 33, then, the communication being completed.

When another communication request for the EPU 13 occurs at another EPU, for example, 14 during the message processing at the EPU 13, the EPU 14 produces the lock request for the second-locking circuit 32. Then, the EPU 14 as a source processor unit transmits a destination address representative of the EPU 13 while writing message into the second mail box 42. The EPU 13 holds the destination address as a correspondence request in a holding circuit 36' similar to the holding circuit 36 in FIG. 1. After transmitting the reply signal for the control processor unit 10 to the third bus 28, EPU 13 reads the message in the second mail box 42 and processes the message according to the correspondence request in the holding circuit 36'. Then, EPU 13 delivers the reply signal for EPU 14 to the second bus 23 after completion of the message processing. Thus, EPU 14 produces the unlock request for the second locking circuit 32 in response to the reply signal and the second locking circuit 32 unlocks the second bus 23 and the second mail box 42.

The holding circuit 36' is formed simple in comparison with the holding circuit 36 in FIG. 1 because the message is stored in the mail box and is not required to be held in the holding circuit.

During the message processing at EPU 13, another communication can be carried out between two other EPUs in the manner as shown in FIG. 8.

Figure 10:
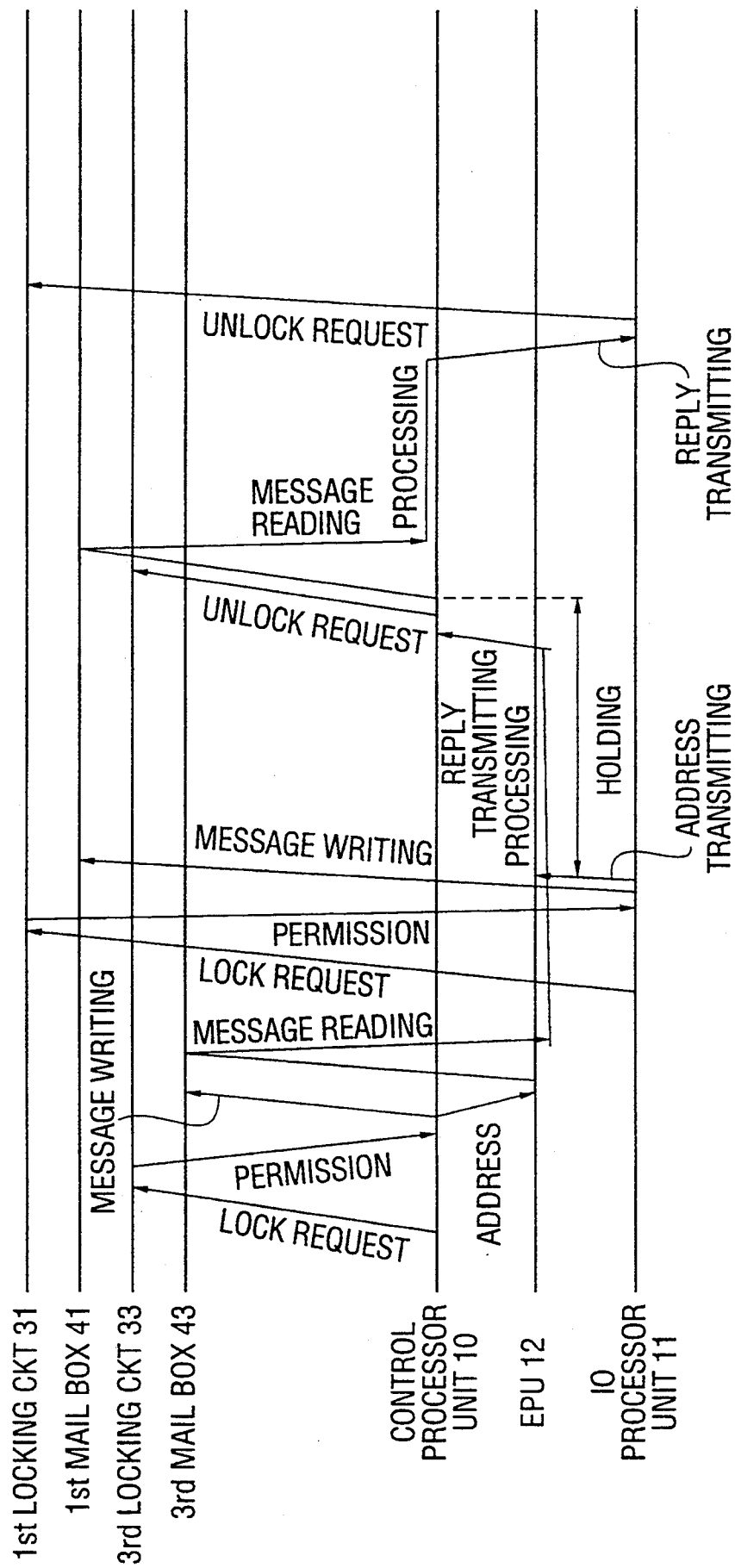

Referring to FIG. 10, an example is illustrated where the IO processor unit 11 makes communication to the control processor unit 10 which is performing another communication with EPU 12. The communication between the control processor 10 and EPU 12 is established in the similar manner as described in connection with FIG. 9. When the IO processor 11 generates the lock request for the first locking circuit 31 according to occurrence of the communication request. The first locking circuit 31 issues the permission signal to the IO processor unit 11 because the first bus 20 and the first mail box 41 are not locked. Then, the IO processor unit 11 transmits a destination address representative of the control processor unit 10 while writing message into the mail box 41.

The control processor unit 10 is provided with a holding circuit shown at 36' which is similar to the holding circuit 36' in each of EPUs 12 to 15 as shown in FIG. 6. The holding circuit 36' holds the destination address as the correspondence request. After completing the communication with EPU 12 in response to the reply signal from EPU 12, the control processor unit 10 reads the message from the first mail box 41 in response to the correspondence request held in the holding circuit 36'. Then, the control processor unit 10 processes the message and generates the reply signal for the IO processor unit 11 after completion of the message processing. In response to the reply signal, the IO processor unit 11 produces the unlock signal to the first locking circuit 31 to unlock the first bus 20 and the first mail box 41.

The IO processor unit 11 is also provided with a similar holding circuit 36'. Therefore, when the IO processor unit 11 is requested to communicate with another processor unit during previous communication with other processor unit, the IO processor unit 11 can hold the requested communication and processes the requested communication in the similar manner as described in connection with FIG. 10 after completion of the previous communication.

Returning to FIG. 6, dotted lines indicate flows of the lock request, the unlock request, the permission signal, and the non-permission signal transmitted between each of first through third locking circuits and each processor unit in the first and the second processor groups. Also, dot-and-dashed lines indicate flows of message between each one of first through third mail boxes and each processor unit in the first and second processor group.

In the embodiment of FIG. 6, the first processor group comprises two processor units, that is, the control processor unit 10 and IO processor unit 11. However, it will be understood that the first processor group can further include another control processor unit or units and/or another IO processor unit or units. In the case, when two units in the first processor group performs communication with each other, other two units in the first processor group can also perform another communication with each other.

In the embodiment of FIG. 6, the reply from each processor unit can be delivered by use of one of the mail boxes in the similar manner as in transmission of the communication information.

Figure 11:
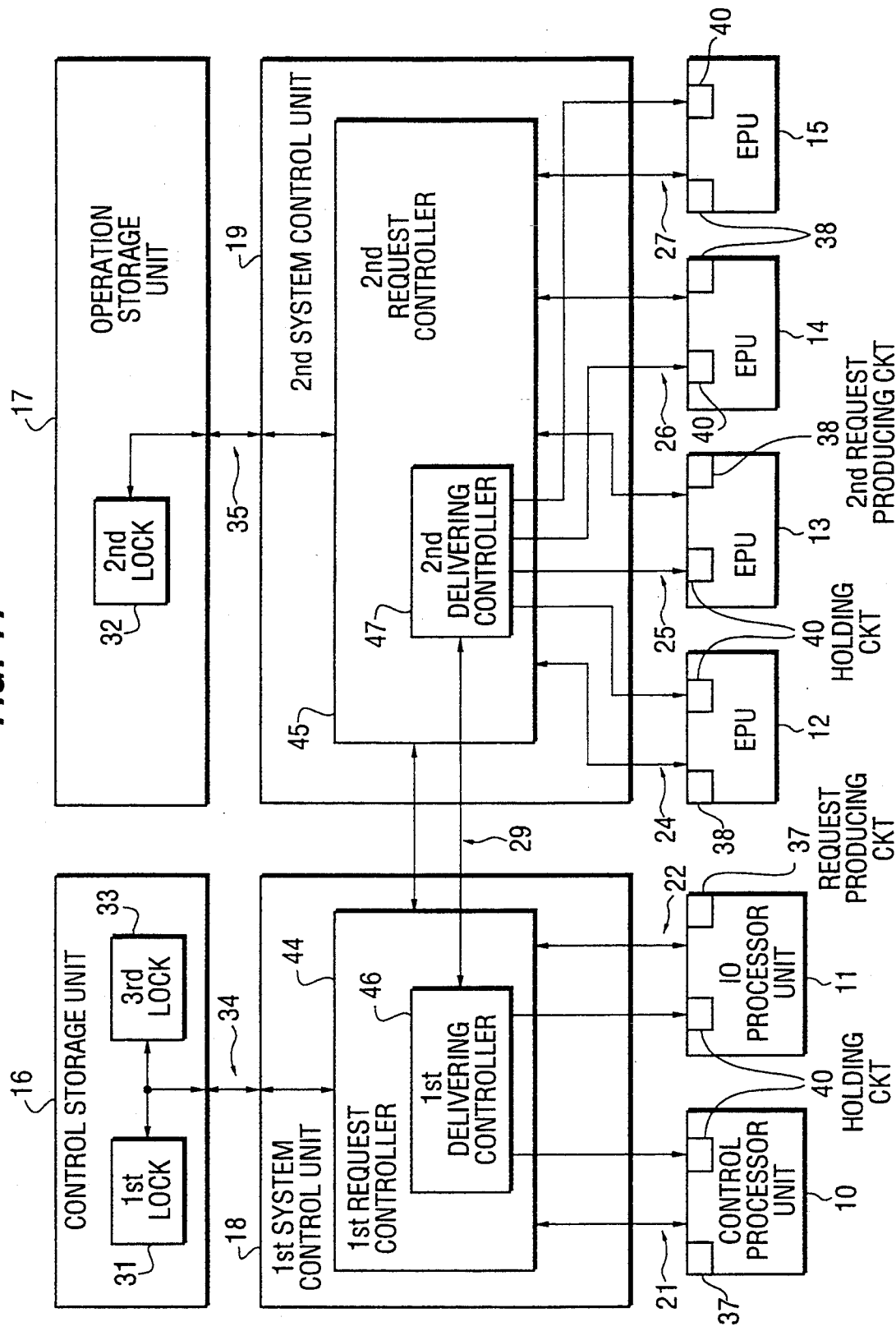
FIG. 11 is a block diagram view similar to FIG. 1 illustrating an interprocessor communication system according to a still another embodiment.

Referring to FIG. 11, another embodiment is shown therein where the unibus system is employed in each of the first and the second system control units 18 and 19. Similar portions are designated by the same reference numerals as in FIG. 1.

The first and the second system control units 18 and 19 comprise first and second request controllers 44 and 45 for controlling access for the control storage unit 16 and the operation storage unit 17, respectively, in the manner as is known in the prior art. The first and the second request controllers 44 and 45 are connected to each other through the interface 29. The first request controller 44 accesses the control storage unit 16 according to request from each of the control processor unit 10 and the IO processor unit 11 and each of the execution processor units 12 through 15 through the second request controller 45 and the interface 29. The second request controller 45 accesses the operation storage unit 17 according to request from each of the execution processors 12 through 15. That is, the first request controller 44 accesses the first locking circuit 31 in the control storage unit 31 according to the lock request for the first locking circuit 31 from one of the control processor unit 10 and the IO processor unit 11 as a reddest source. Then, the first request controller 44 provides the permission or non-permission to the request source. According to the lock request for the third locking circuit 33 from one of processor units 10 through 15 as a request source, the first request controller 44 accesses the third locking circuit 33 and then issues the permission or non-permission to the request source. In the similar manner, the second request controller 45 accesses the second locking circuit 32 in the operation storage unit 17 according to the lock request for the second locking circuit 32 from one of the execution processor units 12 through 15. Then, the second request controller 45 gives the permission or the non-permission to the request source.

The first and the second request controllers 44 and 45 are provided with first and second delivering controllers 46 and 47, respectively, for detecting communication information and delivering the communication information with a communication signal representative of interprocessor communication. The first and the second delivering controllers 46 and 47 are connected to each other through the interface 29. The first delivering controller 46 detects communication information applied thereto from one of the control processor unit 10 and the IO processor unit 11 and delivers the communication information with the communication signal to the processor units 10 and 11 and the second delivering controller 47 through the interface 29. When the first delivering controller 46 receives communication information from the second delivering controller 47 through the interface 29, the first delivering controller 46 delivers the communication information with the communication signal to the control processor unit 10 and the IO processor unit 11.

When the second delivering controller 47 detects communication information applied thereto from one of the execution processor units 12 through 15, the second delivering controller 47 delivers the communication information with the communication signal to the processor units 12 through 15 and the first delivering controller 46 through the interface 29. When the second delivering controller 47 receives communication information from the first delivering controller 46 through the interface 29, the second delivering controller 47 delivers the communication information with the communication signal to all of the execution processor units 12 through 15.

In the embodiment, the transmission means comprises the unibus, the first request controller 44 and the first delivering controller 46 in the first system control unit 18, the unibus, the second request controller 45 and the second delivering controller 47 in the second system control unit 19, and the interface 29. The unibuses in the first and second system control units are illustrated by solid lines with arrows in those system control units 18 and 19.

Each of processor units 10 through 15 is provided with a holding circuit 40 similar to the holding circuit 36 in FIG. 1.

Figure 12:
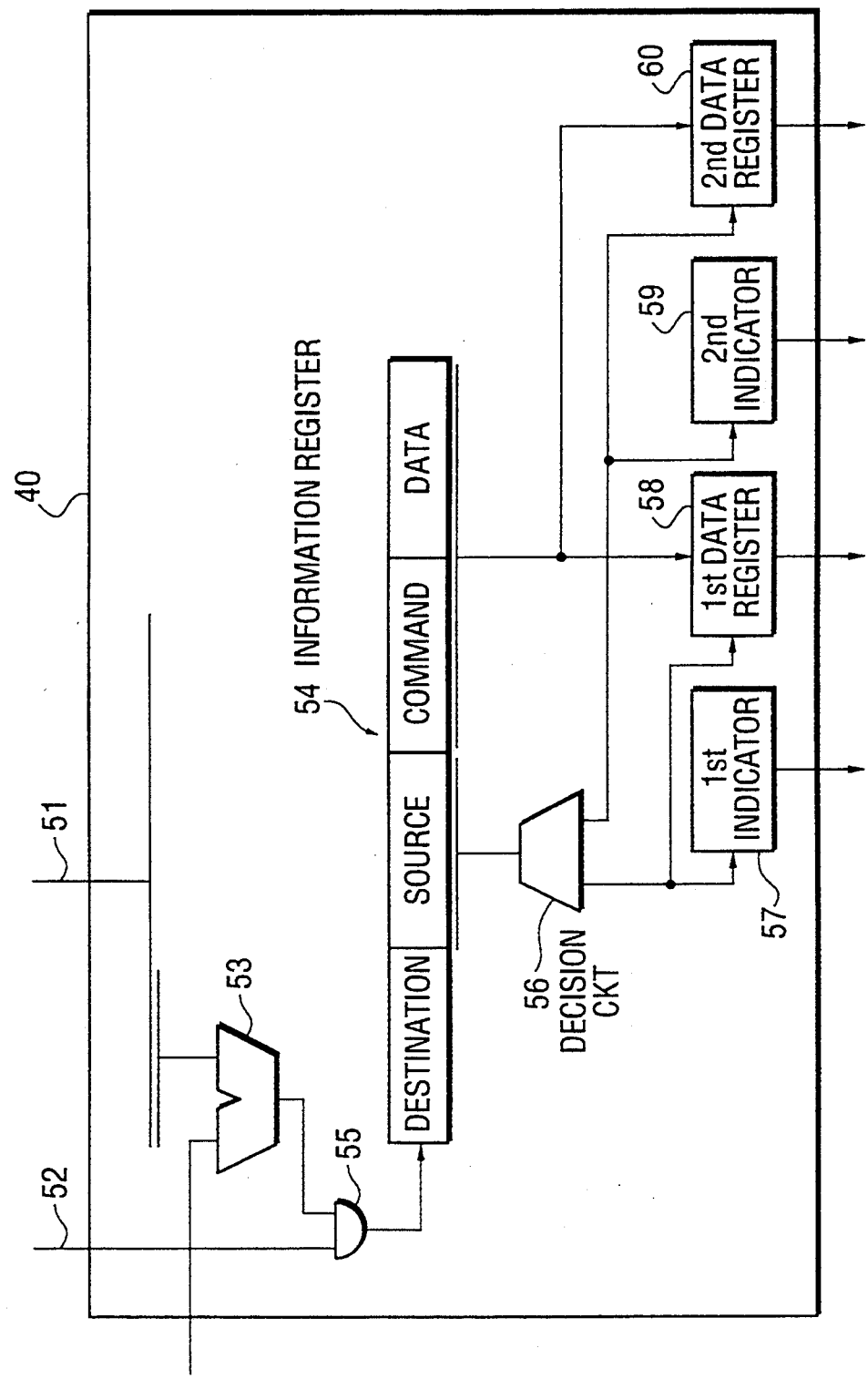
FIG. 12 is a block diagram illustrating a holding circuit used in the embodiment of FIG. 11.

Referring to FIG. 12, the holding circuit comprises two input terminals 51 and 52 for receiving the communication information and the communication signal, respectively. The communication information is applied to a comparator 53 for comparing an address assigned to its own processor unit and the destination address in the communication information. When the comparator 53 detects conformity, the communication information is stored in an information register 54 through an AND gate 55. The information register 54 is coupled with a decision circuit 56 for deciding from the source address in the communication information which the source processor belongs to the first processor group or the second processor group. When the source processor is decided to belong to the first processor group, the decision circuit 56 sets a first indicator 57 such as a flipflop or a register for indicating that the communication information is from the first processor group. At a same time, the decision circuit 56 permits a first data register 58 to store the command and the data from the information register. On the other hand, when the decision circuit 56 decides that the source processor belongs to the second processor group, the decision circuit 56 also drives a second indicator 59 and a second data register 60. The second indicator 59 indicates that the communication information is from the second processor group, and the second data register 60 stores the command and the data from the information register 54.

The processor unit having the holding circuit 40 decides the first and second indicators 57 and 59 and processes the data according to the command in the first data register 58 or second data register 60 when the data should be processed. After completion of data processing, the processor unit produces the reply signal.

In the embodiment, interprocessor communication can be performed in the similar manner as described above in connection with FIGS. 2 to 5. Therefore, description of interprocessor communication is omitted for the purpose of simplification of the description.

In the embodiment of FIG. 11, the command and the data are delivered together witch the destination address and the source address to each processor units. However, first through third mail boxes can be used similar to the embodiment of FIG. 6. In the case, the command and the data are written into a specific one of the mail boxes corresponding to the locking circuit which issues the permission in response to the lock request from the source processor unit. The receiving processor unit reads the command and the data from the specific mail box so as to the data. The interprocessor communication is also performed in the similar manner as described in connection with FIGS. 7 to 10.

What is claimed is:

1. An interprocessor communication system for use in an information processing system having a first processor group including at least one control processor unit and at least one input/output (IO) processor unit and a second processor group of a plurality of execution processor units, said control processor unit performing resource management in said information processing system, said IO processor unit controlling data transmission from and to an IO device, said execution processor units executing tasks, said interprocessor communication system comprising:

first transmission means, coupled to processor units in said first processor group, for transmitting communication information between processor units in said first processor group;

second transmission means, coupled to processor units in said second processor group, for transmitting communication information between processor units in said second processor group;

third transmission means, coupled to processor units in said first and said second processor groups, for transmitting communication information between each one of processor units in said first processor group and each one of processor units in said second processor group;

first request producing means, included in each one of processor units in said first processor group, for producing a first lock request to acquire a first permission, a first specific processor unit in said first processor group generating said first lock request when desiring to communicate with another processor unit in said first processor group, said first specific processor unit acquiring said first permission and transmitting as a first source processor unit first communication information for another processor unit in said first processor group as a first receiving processor unit;

second request producing means, included in each one of processor units in said second processor group, for producing a second lock request to acquire a second permission, a second specific processor unit in said second processor group generating said second lock request when desiring to communicate with another processor unit in said second processor group, said second specific processor unit acquiring said second permission and transmitting as a second source processor unit second communication information for another processor unit in said second processor group as a second receiving processor unit;

each of said first and second request producing means producing a third lock request for acquiring a third permission, a third specific processor unit in one group of said first and said second processor groups generating said third lock request when desiring to communicate with another processor unit in the other group, said third specific processor unit acquiring said third permission and transmitting as a third source processor unit third communication information for one processor unit in the other group of said first and said second processor groups as a third receiving processor unit;

first locking means, coupled to said first request producing means of each of said processor units in said first processor group, for controlling said first permission, said first locking means issuing said first permission to said first specific processor unit in response to said first lock request from said first specific processor unit and thereafter locking issuance of said first permission to reject a first lock request from any one of other processor units in said first processor group;

second locking means, coupled to said second request producing means of each of said processor units in said second processor group, for controlling said second permission, said second locking means issuing said second permission to said second specific processor unit in response to said second lock request from said second specific processor unit and thereafter locking issuance of said second permission to reject a second lock request from any one of other processor units in said second processor group; and third locking means, coupled to said first request producing means of each of said processor units in said first processor group and said second request producing means of each of said processor units in said second processor group, for controlling said third permission, said third locking means issuing said third permission to said third specific processor unit in response to said third lock request from said third specific processor unit and thereafter locking issuance of said third permission to reject a third lock request from any one of other processor units in said first and said second processor groups, such that when said third source processor unit is one of said processor units in said first processor group, said third source processor unit first obtains said third permission from said third locking means and said first permission from said first locking means, and thereafter transmits said third communication information to said third receiving processor unit in said second processor group; and when said third source processor unit is one of said processor units in said second processor group, said third source processor unit first obtains said third permission from said third locking means and thereafter transmits said third communication information to said third receiving processor unit in said first processor group, leaving said second transmission means free for communication between other processor units of said second processor group.

2. An interprocessor communication system as claimed in claim 1, wherein said first communication information comprises a first message and a first destination address representative of said first receiving processor unit, said second communication information comprises a second message and a second destination address representative of said second receiving processor unit, and said third communication information comprises a third message and a third destination address representative of said third receiving processor unit.

3. An interprocessor communication system as claimed in claim 2, wherein said first receiving processor unit processes said first message upon receiving said first communication information, said first receiving processor unit delivering a first reply to said first source processor unit when said first receiving processor unit completes processing of said first message, said second receiving processor unit processes said second message upon receiving said second communication information, said second receiving processor unit delivering a second reply to said second source processor unit when said second receiving processor unit completes processing of said second message, and said third receiving processor unit processes said third message upon receiving said third communication information, said third receiving processor unit delivering a third reply to said third source processor unit when said third receiving processor unit completes processing of said third message.

4. An interprocessor communication system as claimed in claim 3, wherein said first source processor unit drives said first request producing means therein to produce a first unlock request in response to said first reply, said first locking means unlocking issue of said first permission in response to said first unlock request, said second source processor unit driving said second request producing means therein to produce a second unlock request in response to said second reply, said second locking means unlocking said issue of said second permission in response to said second unlock request, said third source processor unit driving one of said first and said second request producing means therein to produce a third unlock request in response to said third reply, said third locking means unlocking issue of said third permission in response to said third unlock request.

5. An interprocessor communication system as claimed in claim 2, wherein said first transmission means comprises a first bus for transmitting said first destination address and a first mail box in which said first source processor unit writes said first message, said first receiving processor unit reading said first message stored in said first mail box upon receiving said first destination address through said first bus, said second transmission means comprises a second bus for transmitting said second destination address and a second mail box in which said second source processor unit writes said second message, said second receiving processor unit reading said second message stored in said second mail box upon receiving said second destination address through said second bus, and said third transmission means comprises a third bus for transmitting said third destination address and a third mail box in which said third source processor unit writes said third message, said third receiving processor unit reading said third message stored in said third mail box upon receiving said third destination address through said third bus.

6. An interprocessor communication system as claimed in claim 2, wherein each processor unit in said first processor group is provided with first holding means for holding said first communication information as a first correspondence request upon receiving as said first receiving processor unit said first communication information from another processor unit in said first processor group through said first transmission means when said each one processor unit is communicating with one processor unit in said second processor group through said third transmission means, and each one processor unit of said second processor group is provided with second holding means for holding said second communication information as a second correspondence request upon receiving as said second receiving processor unit said second communication information from another processor unit in said second processor group through said second transmission means when said each one processor unit in said second processor group is communicating with one processor unit in said first processor group through said third transmission means.

7. An interprocessor communication system as claimed in claim 2, wherein said first transmission means comprises a first mail box in which said first source processor unit writes said first message, said first receiving processor unit reading said first message stored in said first mail box upon receiving said first destination address, said second transmission means comprises a second mail box in which said second source processor unit writes said second message, said second receiving processor unit reading said second message stored in said second mail box upon receiving said second destination address, and said third transmission means comprises a third mail box in which said third source processor unit writes said third message, said third receiving processor unit reading said third message stored in said third mail box upon receiving said third destination address.

8. An interprocessor communication system as claimed in claim 2, wherein said first transmission means includes first delivering means, coupled to processor units in said first processor group, for transmitting said first communication information which said first source processor unit delivers to said first receiving processor unit; said second transmission means includes second delivering means, coupled to processor units in said second processor group, for transmitting said second communication information which said second processor unit delivers to said second receiving processor unit; and said third transmission means includes a data bus, connecting said first and said second delivering means, to transmit said third communication information, said third processor unit delivering said third communication information to said third receiving processor unit.

9. An interprocessor communication system as claimed in claim 1, wherein said first, said second and said third transmission means comprise a first, a second, and a third data bus, respectively.

10. An interprocessor communication system as claimed in claim 1, wherein each one processor unit of said second processor group is provided with holding means for holding said second communication information upon receiving as said second receiving processor unit said second communication information from another processor unit in said second processor group through said second transmission means when, at the same time, said each one processor unit of said second processor group is communicating with one processor unit in said first processor group through said third transmission means.

11. An interprocessor communication system as claimed in claim 1, wherein said third receiving processor unit is one processor unit in said first processor group, said third receiving processor unit producing said first lock request upon receiving said third communication information so as to prevent another processor unit in said first processor group from acquiring said first permission.

12. An interprocessor communication system as claimed in claim 1, wherein when said third source processor unit is one processor unit in said first processor group, said third source processor unit has said first permission in addition to said third permission so that the other processor unit in said first processor group cannot acquire said first permission.

13. An interprocessor communication system as claimed in claim 1, said information processing system further comprising a control storage unit coupled to said control processor unit and to said IO processor unit in said first processor group for storing control programs, and operation storage means coupled to all of the execution processor units in said second processor group for storing a large amount of data to be processed by the execution processor units, wherein said control storage unit is provided with said first and said third locking means, and said operation storage means is provided with said second locking means.

14. An interprocessor communication system as claimed in claim 1, wherein said information processing system further comprises a control storage unit, first system control means for coupling said first processor group to said control storage unit, an operation storage unit, and second system control means for coupling said second processor group to said operation storage unit, said control storage unit being coupled to said second processor group through said first and said second system control means, wherein said first system control means includes said first and said third locking means, and said second system control means includes said second locking means.

* * * * *